V. B. HAGG.
WATER PURIFIER.
APPLICATION FILED APR. 1, 1912.
1,038,353.
Patented Sept. 10, 1912.
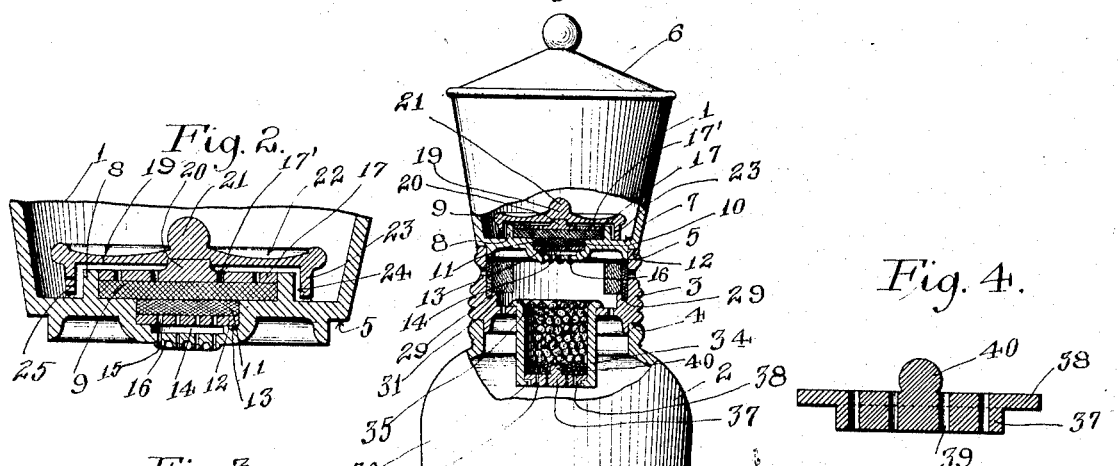
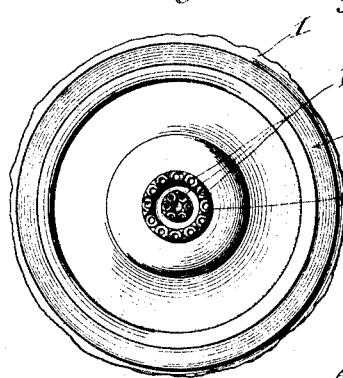
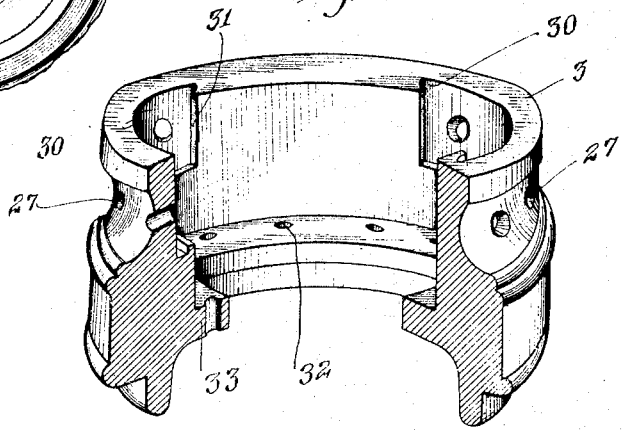
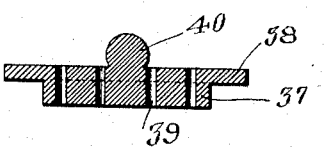
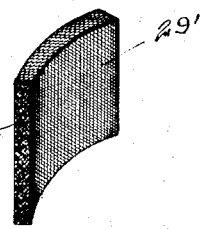
Witnesses:
Inventor,
Virgil B. Hagg.

UNITED STATES PATENT OFFICE.

VIRGIL B. HAGG, OF LOS ANGELES, CALIFORNIA, ASSIGNOR TO CONTINENTAL WATER PURIFYING CORPORATION, OF LOS ANGELES, CALIFORNIA, A CORPORATION OF CALIFORNIA.

WATER-PURIFIER.

1,038,353. Specification of Letters Patent. Patented Sept. 10, 1912.

Application filed April 1, 1912. Serial No. 687,871.

*To all whom it may concern:*

Be it known that I, VIRGIL B. HAGG, a citizen of the United States, residing at Los Angeles, in the county of Los Angeles and State of California, have invented a new and useful Water-Purifier, of which the following is a specification.

The main object of the invention is to provide an efficient and comparatively inexpensive purifier of simple construction in which the metal parts, such as screws or bolts are eliminated and which can be dismantled quickly by unskilled persons for cleaning or removal of broken parts as required.

A further object of the invention is to provide means for controlling the porosity of the filtering material by use of pressure imparted thereto by the operation of gravity.

Another object of the invention is to provide means for accelerating the cooling of the filtered water and increasing the aerating effect thereon by dividing the water into numerous drops during the process of aeration.

Other objects of the invention will appear hereinafter.

The accompanying drawings illustrate an embodiment of my invention, and referring thereto:

Figure 1 is a side elevation of the water purifier partly in section. Fig. 2 is a detail section of the filtering devices. Fig. 3 is an inverted plan of the receiving reservoir. Fig. 4 is a vertical section of a removable bottom plate for the oxidizing chamber. Fig. 5 is a broken perspective of the annular wall for the aerating chamber. Fig. 6 is a perspective of one of the antiseptic aerating screens used for admitting air into the aerating chamber, while excluding germs and dust.

The device comprises a water receiving reservoir 1, a storage reservoir 2, and an intermediate member 3 formed as an annular wall for an aerating chamber, said annular member 3 having an annular shoulder or rabbeted portion 4 resting on top of the storage reservoir 2 and the receiving reservoir 1 having an annular shoulder or rabbeted portion 5 resting on top of the annular member 3. The receiving reservoir may be of earthen ware and may be provided with a removable cover 6. The bottom 7 of said receiving reservoir is formed with an annular flange 8 extending upwardly therefrom, the space within said flange forming a recess for receiving a filter disk 9 of porous material such as mineral wool. A smaller recess 10 may be formed in the bottom 7 within the annular flange 8, said smaller recess being occupied by a second disk 11 of porous material such as asbestos, said disk 11 resting on a perforated plate 12 of earthen ware which is supported by an annular shoulder 13 on the bottom 7, leaving a space 14 between said plate 12 and the middle portion of the bottom 7. This middle portion of the bottom is provided with a series of perforations 15 extending through bosses or depending projections 16 on the bottom 7, forming drip points from which the water drips in a large number of drops. The filtering media or disks 9 and 11 of porous material are compressed by a pressure plate 17 resting thereon, said plate 17 being perforated as at 17' for passage of water therethrough, and being held down by the weight of a plate or disk 19, resting on an upward projection or boss 20 of said plate 17. Said plate 19 may have a knob 21 serving as a handle for lifting the same. The top of the plate 19 is convexly curved or dished as shown at 22 to enable it to catch and retain sediment settling out of the water in the receiving reservoir, said disk 19 extending near the side wall of the receiving reservoir 1 so as to extend under substantially the whole body of water within said reservoir and receive the sediment therefrom. Said disk 19 is further provided with a downwardly extending flange 23 extending around the flange 8 on the bottom 7, but slightly separated therefrom to leave an annular space 24 for the passage of water from the reservoir 1 to the space between the pressure plate 17 and the settling plate 19. Flange 23 is of sufficient height to prevent the disk 19 from touching the top of flange 8, and is perforated as at 25 to provide for passage of water in case the plate 19 settles to its lowest level.

The annular member 3 is formed with a series or plurality of openings 27 for passage of air therethrough from the outside to the interior of the aerating chamber, and within these openings are provided screen means for filtering the air so as to intercept any dust or germs, said means consisting preferably of pads or sheets of absorbent cotton or cotton batting, indicated at 29, said cotton being retained between woven wire or wire mesh 29' preferably of non-corroding material. Said pads or sheets are seated in recesses 30 in the inside of the annular wall 3, said recesses having flanges or ledges 31 along their inner edges to retain the said pads or sheets in position. The annular member 3 is further provided with an inwardly extending annular flange 33, near its lower portion for supporting the oxidizing chamber or carbon receptacle 34, said carbon receptacle having an outwardly extending flange 35 for resting on the flange 33 aforesaid and being provided at its lower end with an inwardly extending flange 36, for supporting a removable bottom disk or plate 37. Flange 33 has openings 32 for ventilating the interior of the storage tank 2. The bottom disk or plate 37 may have an annular flange or shoulder 38 for resting on the flange 36 on the carbon receptacle and is perforated as indicated at 39 for passage of water therethrough, there being preferably a large number of these perforations distributed over said bottom. Said bottom may be provided with a knob 40 to facilitate its removal. In operation the carbon receptacle is perfectly packed in its lower portion with coarse sand or other granular material and above said porous layer is filled or charged with carbon preferably in lumps, causing the water to take a tortuous course in passing through the carbon receptacle.

The operation is as follows: The water is placed in the receiving reservoir or tank 1 and passes gradually through the small openings 25 to the space between the settling disk 19 and the flange 8 and pressure plate 17. The larger particles of solid matter settle out in the tank 1 and are collected on the settling disk 19. The water that passes through the perforated pressure plate 17 and the filtering media 9 and 11 therefore contains only the smaller particles of solid matter and the danger of clogging these media is, therefore, reduced to a minimum. By the application of pressure to the porous media 9 and 11, the filtering efficiency thereof is greatly increased as the interstices are thereby rendered smaller so that the water that issues from the filtering media is substantially free from solid matter. This purified water falls in drops through the perforations 15, the projecting nipples 16 causing the water to drip in separate drops whereby the surface exposed to the action of the air is increased to a maximum. In passing through the aerating chamber 3, the water is areated or subjected to the action of the oxygen of the air and as the said chamber has perforations on all sides, the air circulates freely across the same and subjects the water to effective oxidizing action so as to largely deodorize and destroy any noxious organic matter present. By reason of the cotton pads placed across the ventilating openings there is no possibility of germs or dust passing into the aerating chamber from the outside, so that the full purifying action of the filter is retained. The water that falls onto the carbon lumps in the chamber 34 is subjected to a further oxidizing action by contact with the carbon, the water carrying air with it into the mass of carbon and the large surface offered by the carbon lumps greatly increasing the exposure of the water to the air, and the oxidizing action. By providing the bottom of the carbon receptacles with perforations throughout the same, advantage is taken of the full cross section or capacity of the carbon receptacle in the oxidizing action.

What I claim is:

1. In a water purifier, the combination of a receiving tank having a perforated bottom, a porous medium at the bottom of said tank, a porous pressure plate resting on said medium and a member extending over said porous pressure plate and separated therefrom to allow passage of water to the pressure plate, said member being provided with means for retaining sediment settling thereon, said pressure plate being provided with a projection extending upwardly therefrom to engage the said member, whereby the weight of said member is brought on said pressure plate.

2. In a water purifier, the combination of a receiving tank having a perforated bottom, a porous medium at the bottom of said tank, a perforated pressure plate resting on said medium, a sediment receiving member extending over said perforated pressure plate and provided with a recess in its underface, said pressure plate having an upward projection engaging said recess to support the sediment receiving plate above said pressure plate to allow passage of water to the perforations in the pressure plate.

In testimony whereof, I have hereunto set my hand at Los Angeles, California, this 22nd day of March, 1912.

VIRGIL B. HAGG.

In presence of—
ARTHUR P. KNIGHT,
F. A. CRANDALL.